Fig. 3

April 8, 1969   G. H. FATHAUER   3,438,031
DOPPLER RADAR HAVING DIGITAL SPEED INDICATOR
Filed Nov. 13, 1967   Sheet 3 of 3

United States Patent Office 3,438,031
Patented Apr. 8, 1969

3,438,031
DOPPLER RADAR HAVING DIGITAL SPEED INDICATOR
George H. Fathauer, Decatur, Ill., assignor to Duncan Parking Meter Corporation, Elk Grove Village, Ill., a corporation of New York
Filed Nov. 13, 1967, Ser. No. 682,258
Int. Cl. G01s 9/44
U.S. Cl. 343—8          19 Claims

ABSTRACT OF THE DISCLOSURE

A Doppler radar antenna unit produces a difference frequency signal which is amplified by a pre-amplifier, a variable gain amplifier and a limiter. The amplified signal is then fed through a trigger gate and a manually operable switch to the triggering input of an electronic timer. When the difference frequency signal is sufficiently great, the timer produces a timing pulse which activates a counting gate whereby the difference frequency signal is fed to an electronic digital counter having a digital display which shows the speed of the vehicle under surveillance. The timing pulse also deactivates a feedback gate in the negative feedback path of the variable gain amplifier so as to increase the gain of the amplifier for the duration of the timing pulse. Furthermore, the timing pulse activates a hold circuit which deactivates the trigger gate so as to prevent retriggering of the electronic timer for an interval after the end of the timing pulse. A converter converts the digital output of the counter to an analog output which operates an alarm circuit if the output exceeds a predetermined speed setting. The alarm circuit also continues the activation of the hold circuit so that the speed reading is held if the reading represents an excessive speed.

---

This invention relates to Doppler radar sets for measuring the speed of automobiles or other vehicles.

In such radar sets, an ultra high frequency radar beam is directed at the moving vehicle. A portion of the beam is reflected back to the radar set by the moving vehicle, but at a changed frequency, due to the well known Doppler effect. The reflected signal is received by the radar set and is mixed with a signal at the outgoing frequency, derived from the transmitter, so as to produce a difference frequency signal which has a frequency directly proportional to the speed of the vehicle. The frequency is measured to provide an indication of the speed.

In the Doppler radar sets of the prior art, the difference frequency signal has been converted into a voltage or current which is proportional to the frequency of the signal. The voltage or current is then measured by a conventional meter having a scale which is calibrated in terms of the speed of the vehicle. When a vehicle is picked up within the range of the radar beam, the needle of the meter moves up to a position indicating the speed of the vehicle.

Such meter type radar sets are subject to inaccuracies due to effects of noise components in the incoming signal. This is particularly true when an attempt is made to use the radar set at maximum range, when the reflected signal from the vehicle is very weak. Fading effects tend to cause the needle of the meter to flicker, which makes it difficult to obtain an accurate and reliable reading. The needle of the meter moves rather rapidly and may tend to overshoot its true reading.

The general object of the present invention is to overcome these difficulties and disadvantages, and to provide a greatly improved radar set having a digital speed indicator. Instead of employing a meter to indicate the speed, the radar set of the present invention employs a digital display, which gives a direct numerical reading. The digital display is easy to read and makes it virtually impossible for the operator to take an incorrect reading.

Moreover, the speed measurement is completed very quickly and reliably, even when the radar set is used at the maximum range of the radar beam. Inaccuracies due to noise and the fading of the received signal are virtually eliminated.

In accordance with the present invention, the radar set preferably comprises input means for producing a difference frequency signal having a frequency proportional to the speed of the vehicle, a digital counter adapted to count the cycles of such signal, and an electronic timer for activating the counter for a predetermined timing interval, whereby the counter produces a reading corresponding to the speed of the vehicle.

Preferably, the timer comprises a timing pulse generator which controls a gate connected between the input means and the counter. Means are provided to trigger the timing pulse generator.

The input means usually comprises a radar transmitter-receiver. Preferably, the digital counter comprises a digital display, which may utilize a neon tube having a series of electrodes, arranged to represent the various numerals. Digital displays of other types may also be employed.

In one preferred arrangement, the timing pulse generator is triggered by the difference frequency signal, when it achieves a sufficient amplitude, but the application of such signal to the timing pulse generator is controlled manually by a pushbutton switch or the like. With a radar frequency of about 10,000 megacycles per second, the duration of the timing pulse is only about 30 milliseconds, so that the reading is completed very rapidly. Means are preferably provided to hold the reading for a long enough interval to make it easy to note and record the reading.

Means are preferably provided for resetting the counter to zero before each reading is taken. Preferably, a resetting pulse is derived from the timing pulse generator.

A variable gain amplifier is preferably provided to supply the difference frequency signal to the counter. The timing pulse is preferably employed to increase the gain of the amplifier so that the difference frequency signal will be supplied to the counter in the form of square waves.

It is preferred to provide means for converting the digital reading into a voltage or other analog signal, which is compared with a signal representing the maximum allowable speed. When the analog signal exceeds the allowable level, an alarm circuit is triggered to hold the digital reading, and to actuate an alarm signal.

Various other objects, advantages and features of the invention will appear from the following description, together with the accompanying drawings, in which.

Figure 1:
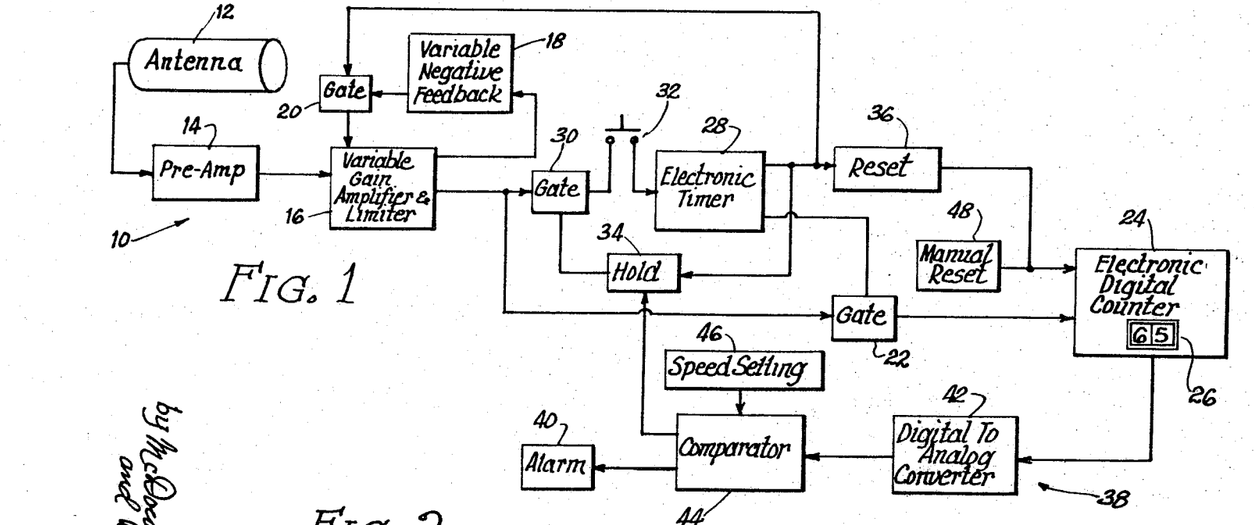
FIG. 1 is a schematic block diagram of a radar set to be described as an illustrative embodiment of the present invention.

As illustrated diagrammatically in FIG. 1, the invention is embodied in a Doppler radar system 10 for measuring the speed of automobiles and other vehicles. The radar system 10 comprises an antenna unit 12 which may be of any known or suitable construction. Generally, the antenna unit 12 comprises a transmitter for producing a microwave signal which is radiated in a narrow beam so as to intercept the path of the vehicles. The microwave signal is in the ultra high frequency range. A suitable frequency is 10,525 megacycles. The microwave signal is reflected by any automobile or other vehicle which may come within range of the radar unit. The reflected signal is received by the antenna unit 12 and is mixed with a portion of the transmitted signal, derived from the transmitter. Due to the Doppler effect, the received signal is at a frequency which differs from the frequency of the transmitted signal, by an amount proportional to the speed of the vehicle. When the received signal is mixed with the transmitted signal, a difference frequency signal is produced, corresponding to the difference between the frequencies of the received and transmitted signals. For a transmitted frequency of 10,525 megacycles, the difference signal has a frequency equal to the product of the speed of the vehicle, in miles per hour, multiplied by 31.4. Thus, for a vehicle speed of 10 miles per hour, the difference signal has a frequency 314 cycles. For a vehicle speed of 100 miles per hour, the difference signal has a frequency of approximately 3140 cycles. The range of speeds from 10 to 100 miles per hour is normally appropriate for a radar set intended for use by policemen in connection with traffic law enforcement.

It will not be necessary to describe the antenna unit 12 in greater detail, because those skilled in the art will be familiar with such units.

In the radar set 10 of FIG. 1, the difference frequency signal from the antenna unit 12 is fed to a preamplifier 14 which greatly amplifies the signal. The output of the amplifier 14 is fed to the input of a second amplifier 16 which is arranged to provide variable gain. The amplifier 16 also acts as a limiter to convert the difference signal into square waves.

In this embodiment, it is preferred to vary the gain of the amplifier 16 by providing a negative feedback network 18 which is controlled by a gate 20. When the gate 20 is disabled, there is no negative feedback, with the result that the amplifier 16 has its full gain. Under such conditions, the amplification of the difference frequency signal is normally so great that the signal is limited or clipped, so that the output signal is in the form of square waves. When the gate 20 is activated, the negative feedback becomes effective, with the result that the gain of the amplifier 16 is greatly reduced. This represents the quiescent state of the amplifier 16. The quiescent gain of the amplifier 16 may be adjusted by changing the negative feedback. Normally, the amplifier 16 is maintained in its quiescent or initial condition, when the reception of a radar signal is being awaited. The reduced gain prevents the actuation of the radar set by noise, or by received signals of insufficient magnitude to produce an accurate reading. When a signal of sufficient strength is received, the gate 20 is disabled, in a manner to be described presently, so that the gain of the amplifier 16 is increased to its maximum value. The increased gain insures that the radar set will measure the speed of the vehicle in an accurate and dependable manner.

The output signal from the amplifier 16 is preferably fed through a gate 22 to the input of an electronic digital counter 24. The counter 24 preferably is equipped with a digital display 26 for registering the count which is achieved by the counter 24. In the quiescent state of the radar set, the gate 22 is disabled, so that signals do not pass through the gate to the electronic counter 24. This arrangement prevents the actuation of the counter 24 by noise pulses, or difference frequency signals of insufficient magnitude to produce an accurate reading.

When a reading is to be taken, the gate 22 is activated for a brief interval by a timing pulse, derived from an electronic timer 28. The electronic counter 24 is then effective to count the cycles of the difference frequency signal which pass through the gate 22, during the length of the timing pulse. The length of the timing pulse is preferably chosen so that the count achieved by the electronic timer 24 is a direct indication of the speed of the vehicle.

Figure 2:
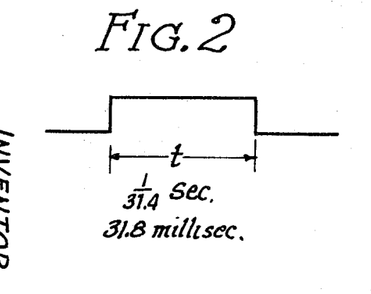
FIG. 2 is a diagram showing the timing pulse developed by the electronic timer or pulse generator.

As already indicated, the particular radar set being described herein produces a difference signal frequency of 31.4 cycles per second, for each mile per hour of the vehicle speed. Thus, as indicated in FIG. 2, the duration $t$ of the timing pulse is preferably chosen as a fraction of one second corresponding to 1 divided by 31.4 or 31.8 milliseconds.

Means are provided to trigger the electronic timer 28. Preferably, the timer 28 is arranged to be triggered by the difference frequency signal from the amplifier 16, when the amplitude of such signal becomes great enough to produce an accurate reading. However, it is also preferred to introduce a factor of manual control over the triggering of the electronic timer 28. Thus, in the illustrated embodiment, the output signals from the amplifier 16 are fed to the electronic timer 28 through a gate 30 and a manually operable switch 32. In the quiescent state of the radar set the gate 30 is activated, so that the difference frequency signals are fed to the electronic timer 28 when the switch 32 is closed. The electronic timer 28 is triggered when the amplitude of such signals exceeds the threshold of the electronic timer 28. It will be understood that in some cases the manually operable control switch 32 may be eliminated.

In the illustrated embodiment, the timing pulse, produced by the electronic timer 28, is preferably employed to control the gate 20, so as to increase the gain of the amplifier 16. The timing pulse is fed to the gate 20 from the output of the electronic timer 28, so that the timing pulse disables the gate 20. The disabling of the gate 20 eliminates the negative feedback, so that the gain of the amplifier 16 increases to its maximum value. At the end of the timing pulse, the gate 20 reverts to its activated state, so that the negative feedback is again in effect.

Means are preferably provided to delay the retriggering of the electronic timer 28 so that the reading will be held on the electronic counter 24 for a sufficient interval to provide for easy reading of the count, as shown by the display 26. For this purpose, the timing pulse from the output of the timer 28 is fed through a hold circuit 34 to the control input of the gate 30. The output from the hold circuit 34 immediately disables the gate 30, so that the difference signal can no longer pass to the input of the electronic timer 28. The hold circuit 34 prolongs the effect of the timing pulse, so that the gate 30 is held in the disabled condition for a substantial time interval or delay sufficient to make it easy to read the count on the digital display 26 of the counter 24. For example, the delay may amount to ½ second or more. This delay also allows time for the operator to release the switch 32, which is preferably of the pushbutton type. The opening of the switch 32 prevents retriggering of the electronic timer 28, so that the reading is held on the counter 24 as long as the operator desires.

When another reading is to be taken, the operator closes the switch 32. Assuming that the hold circuit 34 is timed out, the gate 30 is open, so that any difference frequency signal of sufficient magnitude will retrigger the electronic timer 28, so as to produce another timing pulse. In addition to performing the functions already described, the timing pulse resets the counter 24 to zero. Thus, a reset circuit 36 is connected between the output of the electronic timer 28 and the reset input of the electronic counter 24. The reset circuit 36 produces a brief reset pulse, coinciding with the beginning of the timing pulse. The reset pulse resets the counter 24, but is so short that it does not interfere with the counting function of the counter.

The radar set is also preferably provided with a violation or alarm circuit 38, operable by the counter 24 to perform various functions if the reading of the counter 24 exceeds the maximum permissible level, thus indicating that the vehicle is violating the speed limit. The violation circuit 38 operates an alarm 40, and causes the hold circuit 34 to hold the reading of the timer for an indefinite interval. In the illustrated embodiment, the violation circuit 38 comprises a converter 42 which converts the digital output of the counter 24 to an analog voltage or current, having a magnitude corresponding to the value of the digital output. Thus the counter 24 is connected to the input of the digital-to-analog converter 42. The analog output of the converter 42 is fed to a comparator 44, which compares the analog signal with a variable reference signal produced by a speed setting control 46. The reference signal corresponds to the maximum permissible speed. When the analog signal exceeds the reference signal, the comparator 44 supplies an output signal which activates the alarm 40. The output signal of the comparator 44 is also fed to the hold circuit 34, so as to override the normal operation thereof, and thereby prolong the disabling of the gate 30 for an indefinite interval. The alarm 40 attracts the attention of the operator, so that he will note the reading of the counter 24. When the operator desires to take another reading, he operates a manual reset control 48 which supplies a reset pulse to the counter 24. Thus, the reading of the counter 24 goes to zero, with the result that the violation circuit 38 is cleared. The alarm 40 is deactuated, while the hold circuit 34 is allowed to return to its quiescent state, in which the gate 30 is activated. The operator closes the switch 32 so that any sufficiently strong difference frequency signal will retrigger the electronic timer 28.

Figure 4:
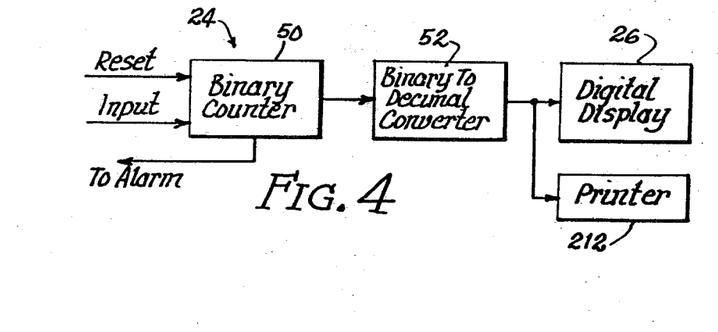
FIG. 4 is a more detailed block diagram of the electronic counter.

Additional details of the electronic digital counter 24 are shown in FIG. 4. While a decimal counter may be employed, it is preferred to employed a binary counter 50. A binary to decimal converter 52 is connected between the binary counter 50 and the digital display 26, so that the display shows the count in the form of conventional decimal numerals. The display 26 may be of any known or suitable type, such as the type utilizing a neon tube with individual electrodes in the shape of the various numerals. The illuminated numeral for each digit is clearly visible, so that the display is easy to read.

It will not be necessary to describe the electronic counter 24 in greater detail, because those skilled in the art will be familiar with such counters. The digital display 26, the binary counter 50 and the binary to decimal converter are all familiar devices. The output of the binary counter 50 is fed to the violation circuit 38.

Figure 3:
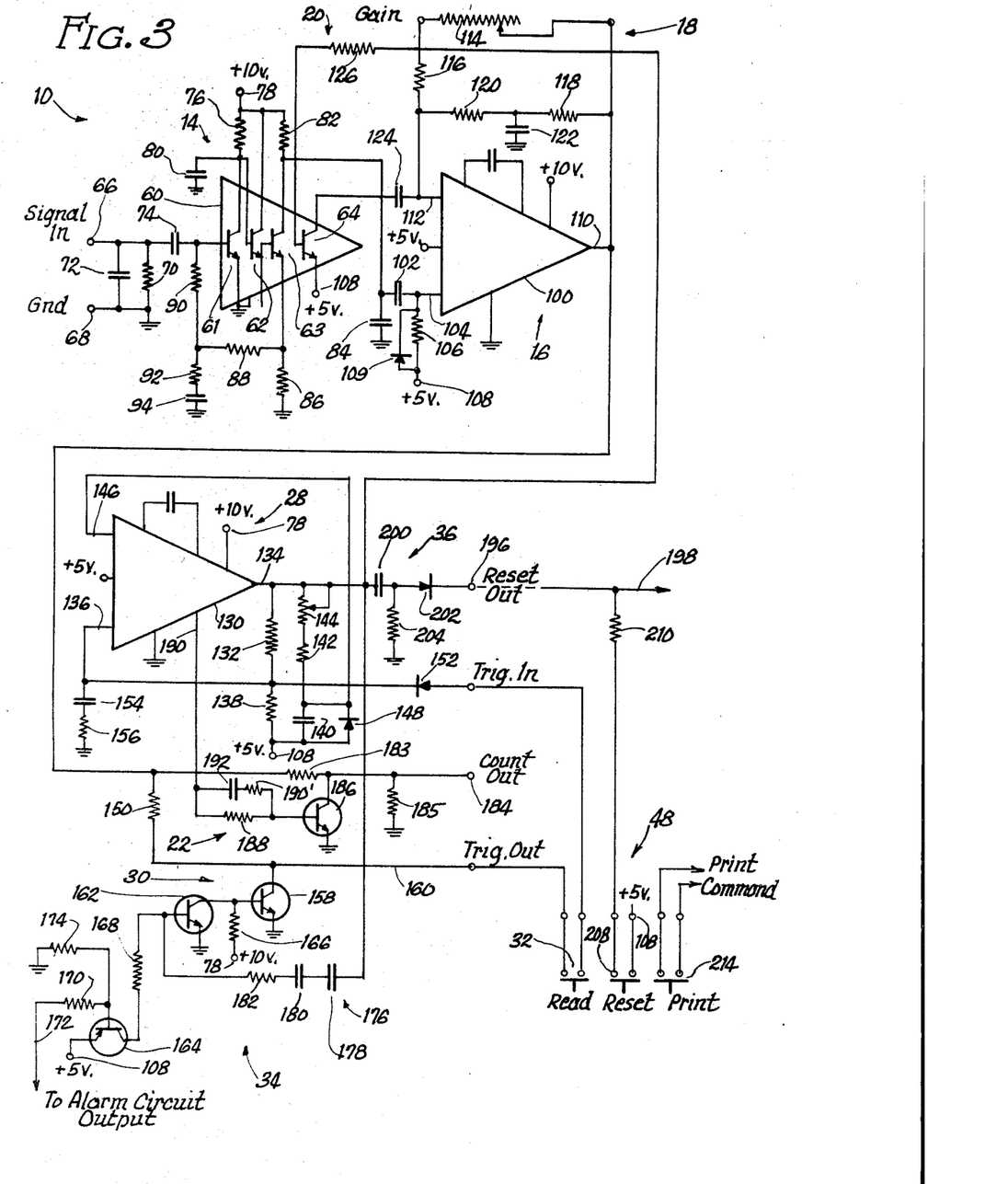
FIG. 3 is a more detailed schematic diagram of the amplifier and timer.

FIG. 3 illustrates additional details of the radar set 10. The amplifier 14 may be of any known or suitable construction. As illustrated, the amplifier 14 comprises an integrated solid state circuit 60 which incorporates four transistors 61, 62, 63 and 64. The first three transistors 61, 62 and 63 are arranged in a three stage direct coupled amplifier circuit, to amplify the difference frequency signal. The fourth transistor 64 is employed in the gate circuit 20, as will be described in greater detail presently.

The difference frequency signal from the antenna unit 12 is applied between input terminals 66 and 68, the latter of which is grounded. A resistor 70 and a capacitor 72 are connected across the input terminals 66 and 68. The capacitor 72 reduces the amplitude of noise and other high frequency signals.

A coupling capacitor 74 is connected between the input terminal 66 and the base of the transistor 61. The emitter of the transistor 61 is grounded. It will be seen that the collector of the transistor 61 is connected directly to the base of he transistor 62. A load resistor 76 is connected between the collector and a positive power supply terminal 78 which may supply about 10 volts. To reduce the amplitude of noise and other high frequency signals, a capacitor 80 is connected between the collector and ground.

The emitter of the transistor 62 is connected directly to the base of the transistor 63. In this case, the collector of the transistor 62 is connected directly to the positive power supply terminal 78.

A load resistor 82 is connected between the positive power supply terminal 78 and the collector of the transistor 63. The output of the amplifier 14 is developed across the resistor 82. High frequency noise components and other unwanted high frequency signals are reduced in amplitude by a capacitor 84, connected between the collector and ground.

A resistor 86 is connected between the emitter of the transistor 63 and ground. The resistor is employed for biasing and feedback purposes. A feedback resistor 88 and a base return resistor 90 are connected between the emitter of the transistor 63 and the base of the transistor 61. This connection provides negative feedback. It will be seen that a resistor 92 and a capacitor 94 are connected in series, between the junction of the resistors 88 and 90 and ground. This arrangement reduces the negative feedback for the higher frequencies. Thus, the negative feedback reduces the gain of the amplifier for extremely low frequencies, particularly those representing vehicle speeds less than about 10 miles per hour. It will be evident that the amplifier 14 has reduced gain as to both extremely high and extremely low frequencies. In this way, noise components and other unwanted signals are reduced.

It will be understood that the details of the amplifier 14 may be varied, and that any known or suitable components may be employed. Similarly, various known or suitable components may be employed in the second amplifier 16. The illustrated amplifier 16 employs an integrated operational amplifier 100. Those skilled in the art will be familiar with such operational amplifiers. Thus, such integrated operational amplifiers are disclosed in detail in an application note, AN-204, entitled, "High Performance Integrated Operational Amplifiers" published by Motorola Semiconductor Products Inc. in 1966. A coupling capacitor 102 is connected between the collector of the transistor 63 and the normal input terminal 104 of the operational amplifier 100. A return resistor 106 is connected between the input terminal 104 and a power supply terminal 108 which may supply about +5 volts, relative to ground. It will be seen that a clamping diode 109 is connected across the resistor 106.

The output of the operational amplifier 100 is taken at the normal output terminal 110. The negative feedback circuit 18 is connected between the output terminal 110 and the inverted input terminal 112. The illustrated feedback circuit 18 comprises resistors 114 and 116 connected in series between the output terminal 110 and the input terminal 112, to provide negative feedback for the signal frequencies. The resistor 114 is variable to provide for adjustment of the signal feedback. For stabilization purposes, the feedback circuit 18 also includes means for providing direct current feedback. Such means comprise two resistors 118 and 120 connected in series between the output terminal 110 and the input terminal 112 and a by-pass capacitor 122 connected between ground and the junction of the resistors 118 and 120. The capacitor 122 eliminates any substantial feedback at the signal frequencies though the resistors 118 and 120.

As already indicated, the transistor 64 is employed in the gate circuit 20 which controls the negative feedback circuit 18. As shown, the collector of the transistor 64 is coupled to the input terminal 112 by a capacitor 124 which acts as a by-pass capacitor for the signal frequencies, when the transistor 64 is conductive. The emitter of the transistor 64 is connected to the +5 volt terminal 108, which is adequately by-passed to ground for the signal frequencies. The base of the transistor 64 is adapted to receive a gating pulse from the electronic timer 28 through a resistor 126, as will be described in greater detail presently. In this way, the transistor 64 is rendered conductive for the duration of the timing pulse. The conductive transistor has the effect of virtually short-circuiting the negative feedback at the signal frequencies, so that the gain of the amplifier 16 is greatly increased. The variable resistor 114 provides an adjustment of the quiescent gain of the amplifier 16.

The electronic timer 28 may employ various known or suitable components. As illustrated, the timer 28 utilizes an integrated operational amplifier 130, similar to the integrated operational amplifier 100, connected as a single shot multi-vibrator. Thus, the operational amplifier 130 is normally in a quiescent or primary state. The amplifier may be triggered to a secondary state, but it reverts to its primary state, after a predetermined time interval.

This multi-vibrator action requires positive feedback, which is provided by a resistor 132 connected between the normal output terminal 134 and the normal input terminal 136 of the operational amplifier 130. A return resistor 138 is connected between the input terminal 136 and the +5 volt terminal 108.

When a positive pulse of sufficient magnitude is applied to the input terminal 136, the positive feedback causes the amplifier 130 to trigger into a state in which the output terminal 134 is at approximately +10 volts, corresponding to the voltage of the power supply terminal 78. A capacitor 140 then starts to become charged through resistors 142 and 144. The capacitor 140 and the resistors 142 and 144 are connected between the +5 volt terminal 108 and the output terminal 134. The resistor 144 is variable so that the time constant of the R-C circuit can be changed. In this way, the duration of the timing pulse can be varied.

The inverted input terminal 146 of the operational amplifier 130 is connected to the junction between the capacitor 140 and the resistor 142. When the capacitor 140 becomes sufficiently charged, the voltage at the inverted input terminal 146 triggers the operational amplifier 130 so that it reverts to its original state. A clamping diode 148 is connected between the +5 volt terminal 108 and the input terminal 146, so that the input terminal cannot drop substantially below +5 volts.

In the illustrated embodiment, the electronic timer 28 is triggered by supplying the difference frequency signals to the normal input terminal 136, through the gate circuit 30 and the pushbutton switch 32. The gate circuit 30 may assume various forms, but is illustrated as comprising a resistor 150. It will be seen that the resistor 150, the pushbutton switch 32, and the diode 152 are connected in series between the output terminal 110 of operational amplifier 100 and the input terminal 136 of the operational amplifier 130. When the gate circuit 30 is activated, the difference frequency signals pass through the resistor 150, the switch 32, and the diode 152 to the electronic timer 28. A capacitor 154 and a resistor 156 are connected in series between the input terminal 136 and ground, to reduce the amplitude of noise.

The gate circuit 30 is controlled by a transistor 158. As shown, the collector of the transistor 158 is connected to a lead 160 which extends between the resistor 150 and the switch 32. The emitter of the transistor 158 is grounded. In the quiescent state of the radar set, the transistor 158 is nonconductive, so that it does not affect the transmission of the difference frequency pulses to the electronic timer 28. The generation of the timing pulse by the electronic timer 28 has the effect of causing the transistor 158 to become conductive, so that it virtually short-circuits the lead 160 to ground. As long as this condition exists, the difference frequency pulses are not applied to the electronic timer 28.

In the illustrated gate circuit 30, the transistor 158 is controlled by another transistor 162, which, in turn, is controlled by a transistor 164. Thus, the base of the transistor 158 is connected directly to the collector of the transistor 162. The emitter of the transistor 162 is grounded. A load resistor 166 is connected between the collector and the +10 volt terminal 78.

The base of the transistor 162 is connected to the collector of the transistor 164 through a resistor 168. The emitter of the transistor 164 is connected to the +5 volt terminal 108. Through a resistor 170 and a lead 172, the base of the transistor 164 is connected to the violation or alarm circuit 38, as will be described in greater detail presently. Another resistor 174 is connected between the base and ground. In the quiescent state of the radar set, the violation circuit causes the transistor 164 to be conductive. The transistor 162 is also conductive, but the transistor 158 is nonconductive.

The gate circuit 30 is arranged so that it is controlled by the timing pulse. For this purpose, a control circuit 176 is connected between the output terminal 134 of the operational amplifier 130 and the base of the transistor 162. The control circuit 176 comprises two capacitors 178 and 180 in series with the resistor 182. The timing pulse causes the charging of the capacitors 178 and 180 through the resistor 182 and the transistor 162. During the timing pulse, the output terminal 134 goes positive to about +10 volts. At the end of the timing pulse, the voltage at the output terminal 134 drops to a low value, with the result that the voltage across the charged capacitors 178 and 180 drives the base of the transistor 162 to a negative voltage, relative to ground. Thus, the transistor 162 becomes nonconductive. As a result, the transistor 158 becomes conductive, so that it virtually short-circuits the difference frequency pulse input to the electronic timer 28. The transistor 162 remains nonconductive until the capacitors 178 and 180 discharge through the resistor 182, the resistor 168, and the transistor 164. Meanwhile, the gate circuit 30 prevents the passage of the difference frequency pulses to the electronic timer 28 so that the timer will not be retriggered. Thus the reading on the electronic counter 24 will be held for a substantial interval, so that the counter can easily be read.

The timing pulse from the electronic timer 28 also controls the gate circuit 22 through which the difference frequency pulses are transmitted to the electronic counter 24. The gate circuit 22 may assume various forms, but is illustrated as comprising a resistor 183 connected between the output terminal 110 of the operational amplifier 100 and the terminal 184 which is connected to the electronic timer 24. When the gate circuit 22 is activated, the difference frequency pulses are fed through the resistor 183 to the electronic timer 24. Another resistor 185 is connected between the terminal 184 and the ground.

The gate circuit 22 is controlled by a transistor 186 having its collector connected to the output terminal 184. The emitter of the transistor 186 is grounded. In the quiescent state of the radar set, the transistor 186 is conductive so that the difference frequency pulses are virtually short-circuited to ground. The base of the transistor 186 is connected through a resistor 188 to the inverting output terminal 190 of the operational amplifier 130. A resistor 190' and a capacitor 192 are connected in series across the resistor 188.

An inverted pulse, corresponding to the timing pulse, appears at the output terminal 190. Thus, a positive voltage appears at the output terminal 190 in the quiescent state of the radar set. This positive voltage causes the transistor 186 to be conductive. During the timing pulse, the output terminal 190 goes negative, so as to cause the transistor 186 to be nonconductive. The capacitor 192 accelerates the activation of the gate circuit 22. After the end of the timing pulse, output terminal 190 again goes positive, so as to cause the transistor 186 to become conductive. Thus the transistor 186 again short-circuits the difference frequency pulses to ground, so that they are not supplied to the electronic counter 24. The provision of the resistor 183 prevents the operation of the gate circuit 22 from affecting the gate circuit 30. Similarly, the resistor 150 prevents the gate circuit 30 from affecting the gate circuit 22.

The timing pulse is also employed to produce a reset pulse, which is supplied to an output terminal 196, to which the reset line 198 of the electronic counter 24 is connected. The reset circuit 36 is connected between the output terminal 134 of the electronic timer 28 and the terminal 196. As shown, the reset circuit 36 comprises a capacitor 200 and a diode 202 which are connected in series between the terminals 134 and 196. A resistor 204 is connected between ground and the junction between the capacitor 200 and the diode 202. The capacitor 200 and the resistor 204 differentiate the timing pulse, so as to produce a sharp positive spike of very brief duration, coinciding with the beginning of the timing pulse. The diode 202 transmits the positive spike to the electronic counter 24, where it is effective to reset the counter to zero. The capacitor 200 and the resistor 204 also produce a negative spike at the end of the timing pulse but the diode 202 prevents the transmission of the negative spike to the electronic timer.

The manual reset circuit 48 comprises a manually operable switch 208, preferably on the pushbutton type. The switch 208 is connected in series with a resistor 210 between the reset terminal 196 and the +5 volt terminal 108. The closure of the switch 208 supplies +5 volts to the reset line 198, which is sufficient to reset the timer of the counter 24 to zero.

As shown in FIG. 4, a printer 212 may be connected to the output of the electronic counter 24, to make a permanent printed record of the readings which are shown by the digital display 26. As shown in FIG. 3, another pushbutton switch 214 is preferably provided to activate the printer 212. The operator closes the switch 214 when he desires to make a printed record of any particular reading on the counter 24.

Figures 5, 6:
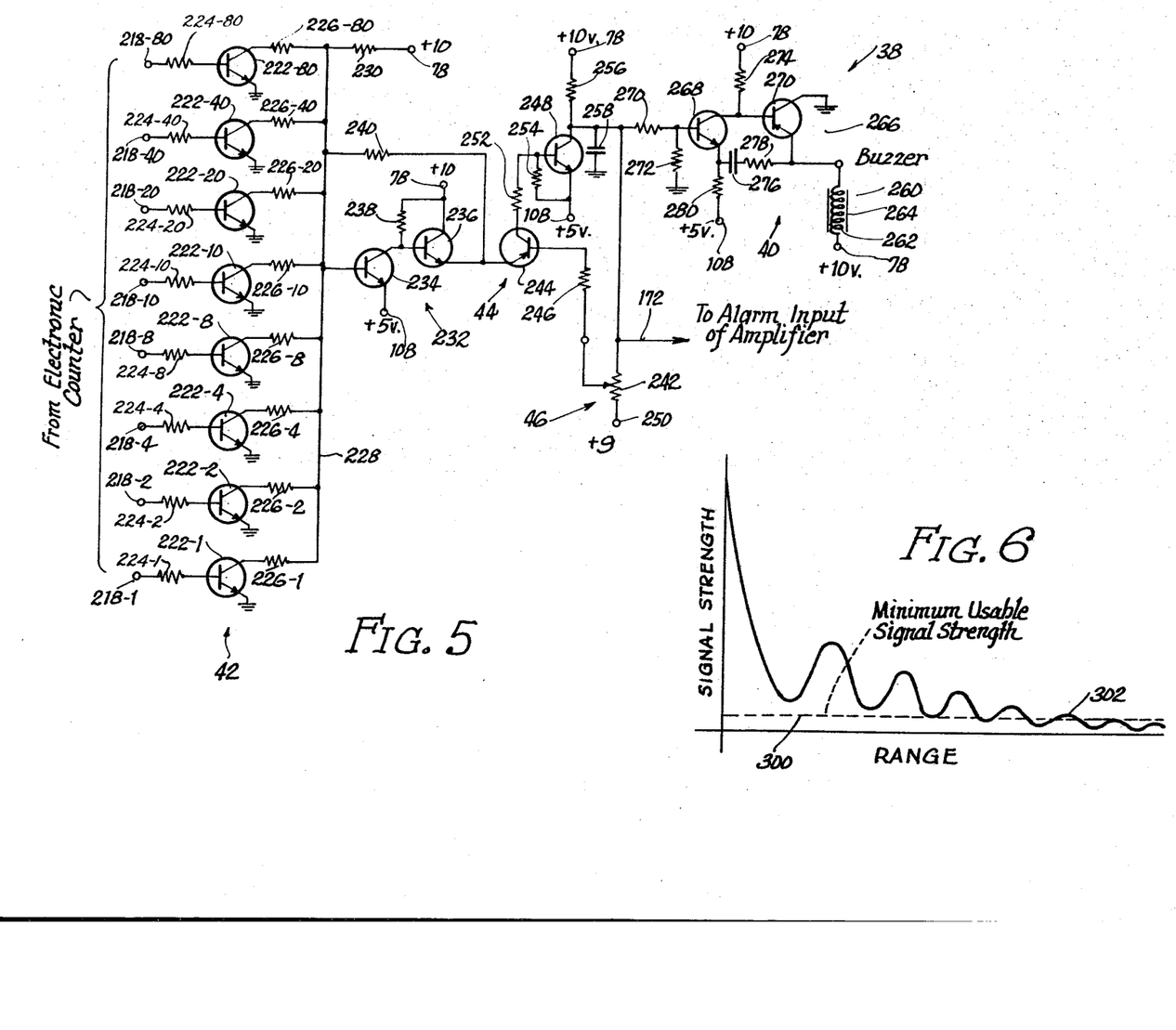
FIG. 5 is a more detailed schematic diagram of the alarm circuit.
FIG. 6 is a curve showing the variation of signal strength with increasing range and illustrating the operation and advantages of the digital radar set.

FIG. 5 illustrates details of the alarm circuit 38. The digital to analog converter 42 produces an analog voltage corresponding to the digital count on the electronic counter 24. As already indicated, the electronic counter 24 comprises a binary counter circuit 50 and a binary to decimal converter 52. The output of the binary counter 50 is preferably employed to operate the alarm circuit 38. Thus, the digital to analog converter 42 has eight input terminals which are connected to the binary counter 50. It will be understood that the binary-coded decimal counter is of the familiar type having a plurality of modules, each with four stages. In the units module, the stages register counts of 1, 2, 4 and 8. In the tens module, the stages register counts of 10, 20, 40 and 80. Thus, the eight input terminals of the converter 42 are designated 218-1, 218-2, 218-4, 218-8, 218-10, 218-20, 218-40 and 218-80, to indicate that the terminals are connected to the eight stages of the binary counter.

The illustrated converter 42 comprises transistors 222-1 through 222-80 which are connected to the input terminals 218-1 through 218-80. Isolating resistors 224-1 through 224-80 are connected between the input terminals and the bases of the corresponding transistors. The emitter of each transistor is grounded. Resistors 226-1 through 226-80 are connected between the respective collectors and a common lead 228. It will be seen that a resistor 230 is connected between the lead 228 and the +10 volt terminal 78. The resistors 226-1 through 226-80 have weighted values, such that current through each resistor when the corresponding transistor is conductive, is proportional to the digital value of the counter-stage to which the transistor is connected. Thus the converter 42 produces a total current which is an analog of the total count registered by the electronic counter 24. In the illustrated converter 42 an operational amplifier 232 is provided to convert the current analog to a voltage analog. As shown, the operational amplifier 232 comprises two transistors 234 and 236. The base of the first transistor 234 is connected to the common lead 228 while the emitter is connected to the +5 volt terminal 108. The collector of the transistor 234 is connected directly to the base of the second transistor 236. A load resistor 238 is connected between the collector of the transistor 234 and the +10 volt terminal 78. The collector of the second transistor 236 is connected directly to the +10 volt terminal. It will be seen that the emitter of the second transistor 236 is connected back to the common line 228 through a resistor 240. The analog voltage appears at the emitter of the second transistor 236. In this case, the analog voltage varies from about +9 volts for zero count, representing zero vehicle speed, to +5 volts for a count of 100, representing a vehicle speed of 100 miles per hour.

With the counter 24 set to zero, all of the transistors 222-1 through 222-80 are conductive. For any given count, the corresponding transistors will be nonconductive so that the analog voltage is developed at the emitter of the transistor 236. The analog voltage is an inverse function of the count, in that the analog voltage decreases when the count increases.

The analog voltage is compared with a preset voltage, representing the maximum permissible vehicle speed, above which a violation takes place. In this case, the preset voltage is developed by a manually adjustable potentiometer 242, adapted to provide a voltage in the range from +5 to +9 volts. The potentiometer 242, and the associated components, constitute the speed setting control 46 of FIG. 1, in this embodiment. A transistor 244 is employed to compare the voltage from the potentiometer 242 with the analog voltage at the emitter of the transistor 236. Thus, the transistor 244, and the associated components, constitute the comparator 44 of FIG. 1. It will be seen that the emitter of the transistor 244 is connected to the emitter of the transistor 236. The base of the transistor 244 is connected to the slider of the potentiometer 242 through a resistor 246.

When a violation occurs, the analog voltage at the emitter of the transistor 244 drops below the preset voltage, with the result that the transistor 244 becomes nonconductive. To provide a triggering action, the transistor 244 and the potentiometer 242 are connected in a feedback circuit, which includes a second transistor 248. One side of the potentiometer 242 is connected to a +9 volt power supply terminal 250, while the other side of the potentiometer is connected to the collector of the transistor 248. The emitter is connected to the +5 volt terminal 108. Thus, when the transistor 248 is conductive, the collector is effectively clamped to the +5 volt terminal. A coupling resistor 252 is connected between the collector of the resistor 244 and the base of the transistor 248. A return resistor 254 is connected between the base and the emitter of the transistor 248. It will be seen that a load resistor 256 is connected between the collector of the transistor 248 and the +10 volt terminal 78. To limit the speed of the triggering action, a capacitor 258 is connected between the collector and ground.

The output of the violation or alarm circuit 38 is taken at the collector of the transistor 248. Thus, the lead 172, also shown in FIG. 3, is connected to the collector of the transistor 248. This lead 172 is connected to the alarm input of the hold circuit 34, which in turn is connected to the gate circuit 30.

When a violation occurs, the collector of the transistor 248 goes positive, with the result that the transistor 164 of FIG. 3 is rendered nonconductive. This in turn renders the transistor 162 nonconductive, so that the gate transistor 158 will be conductive. Thus, the trigger line 160 is effectively short-circuited to ground, so that the electronic timer 28 will not be triggered. The reading will be retained on the electronic counter 24 until the counter is manually reset to zero.

As illustrated in FIG. 5, the audible alarm 40 includes a buzzer or sounder 260 comprising a coil 262 and a diaphragm or armature 264. A multivibrator circuit 266 is employed to operate the buzzer 260. The illustrated multivibrator 266 comprises two transistors 268 and 270.

The transistor 268 is arranged to be gated by the output of the alarm circuit. Thus, the base of the transistor 268 is connected to the collector of the transistor 248 through a coupling resistor 270. A return resistor 272 is connected between the base and the ground. The collector of the transistor 268 is connected directly to the base of the transistor 270, and is also connected through a load resistor 274 to the +10 volt terminal 78. Feedback is provided by a capacitor 276 and a resistor 278 connected between the emitters of the transistors 268 and 270. A load resistor 280 is connected between the emitter of the transistor 268 and the +5 volt terminal 108.

The collector of the transistor 270 is grounded. The emitter is connected through the coil 262 of the buzzer 260 to the +10 volt terminal 78.

When a violation occurs, the collector of the transistor 248 goes positive to nearly +10 volts. As a result, the transistor 268 is rendered conductive, so that the multivibrator 266 generates a train of pulses which are translated into sound by the buzzer 260.

It may be helpful to summarize the operation of the radar set 10, although the operation has already been fully described. The antenna unit 12 develops a difference frequency signal, normally in the audio frequency range, representing the difference between the frequency of the transmitted microwave signal and the reflected signal from the vehicle. The frequency of the reflected signal is shifted, due to the speed of the vehicle.

The difference frequency signal is greatly amplified by the preamplifier 14 and is fed to the variable gain amplifier 16. In the quiescent state of the radar set, the gain of the amplifier 16 is relatively low, due to the negative feedback provided by the feedback circuit 18. The quiescent gain may be changed by adjusting the variable resistor 114 in the feedback circuit. Under quiescent conditions, the gate 20 is activated.

The difference frequency signal from the output of the amplifier 16 is fed through the gate 30 and the pushbutton switch 32 to the triggering input of the electronic timer 28. Under quiescent conditions the gate 30 is activated. The operator closes the switch 32 when he wants to measure the speed of a vehicle coming into the range of the radar set.

When the difference frequency signal becomes strong enough to trigger the electronic timer 28, a single timing pulse is generated by the timer, with a square wave form, as shown in FIG. 2. The duration of the timing pulse corresponds to one cycle of the difference frequency signal, for a vehicle speed of one mile per hour. In the illustrated embodiment, the duration of the timing pulse is about 31.8 milliseconds.

The timing pulse from the electronic timer 28 is fed to the reset circuit 36, which supplies a reset pulse to the electronic counter 24 so as to reset the counter to zero. The reset pulse is preferably of brief duration so that it does not interfere with the counting functions of the timer 24.

The timing pulse is also fed to the gate 22, which is activated for the duration of the pulse. Thus the difference frequency signal passes through the gate 22 to the electronic timer 24, for the duration of the timing pulse. The electronic timer 24 counts the cycles or pulses of the difference frequency signal and registers the count on the digital display 26. This count is a direct reading of the vehicle speed. Thus, for example, for a vehicle speed of 65 miles per hour, the count registered by the counter 24 will be 65.

The gate 22 is controlled by the transistor 186 which is conductive in the quiescent state of the radar set. The conductive transistor effectively short-circuits the difference frequency pulses to ground, before they reach the electronic counter 24. The transistor 186 is driven to a nonconductive state for the duration of the timing pulse. When the transistor is nonconductive, the difference frequency pulses are transmitted to the electronic counter 24.

The triggering gate 30 is controlled by the transistor 158, which is nonconductive in the quiescent state of the radar set. This represents the activated condition of the gate.

The timing pulse from the electronic timer 28 is also fed to the hold circuit 34, which disables the gate 30, so that the retriggering of the electronic timer 28 will be delayed. This delay makes it easy to read the counter 24. The hold circuit 34 comprises the transistors 162 and 164, and the associated components. The transistor 162 is conductive, in the quiescent state of the radar set. The timing pulse charges the capacitors 178 and 180, which provide a voltage to drive the transistor 162 to a nonconductive state, at the end of the timing pulse, until the capacitors discharge through the resistors 168 and 182 and the transistor 164. When the transistor 162 is driven nonconductive, the transistor 158 is driven conductive, so that the triggering line 160 is effectively short-circuited to ground.

It is preferred to employ the timing pulse to increase the gain of the amplifier 16, although this function may be dispensed with in some cases. The timing pulse is fed to the gate 20 so as to disable the gate, and thereby eliminate the negative feedback normally provided by the feedback circuit 18. The gain of the amplifier 16 is thus greatly increased. The increased gain provides ample signal strength to operate the electronic counter 24. Moreover, the increased gain insures that the amplifier 16 will limit or clip the difference frequency signal so that such signal will be supplied to the electronic counter 24 in the form of a train of square wave pulses.

The gate 20 is controlled by the transistor 64, which is normally nonconductive. The timing pulse drives the transistor 164 to a conductive state, so that it effectively short-circuits the negative feedback circuit 18.

The violation or alarm circuit 38 is an additional feature of the radar set. The converter 42 receives the digital output from the counter 24 and produces an analog voltage having a value which corresponds to the digital reading of the counter. This analog voltage appears at the emitter of the transistor 236. The analog voltage is compared with a preset voltage by the comparator 44, which comprises the transistors 244 and 248, and the associated components. The preset voltage is established by the manually adjustable potentiometer 242 in the speed setting circuit 46. The preset voltage from the potentiometer 242 represents the maximum permissible speed, above which a violation occurs.

In the quiescent state, the transistors 244 and 248 are conductive. When a violation occurs, the transistors 244 and 248 become nonconductive, with the result that the collector of the transistor 248 goes positive. This positive signal causes the transistor 164 in the hold circuit 34 to become nonconductive, with the result that the hold transistor 162 also becomes nonconductive. The gate transistor 158 is thereby rendered conductive, so that it effectively short-circuits the triggering line 160. Thus the retriggering of the electronic timer 28 is prevented, so that the reading on the counter 24 is retained, until the counter is manually reset. This is done by operating the pushbutton switch 208 in the manual reset circuit 48, with the result that a positive resetting pulse is supplied to the electronic timer 24. To retrigger the electronic timer 28, it is necessary to close the switch 32 so that the difference frequency pulses will be supplied to the electronic timer.

The present invention has a number of important advantages and achievements. The vehicle speed is clearly and unmistakably displayed in the form of numerals on the digital display 26. A permanent printed record of the speed reading can also be obtained by operating the printer 212 which is connected to the electronic counter 24.

The speed measurement is extremely accurate, inasmuch as it is obtained by actually counting the cycles of the difference frequency signal. The cycles are counted for an accurately timed interval, such that the number of cycles corresponds directly to the speed of the vehicle.

Each speed measurement is completed very rapidly, in a small fraction of a second. In the case of the illustrated embodiment, the speed measurement is completed in 31.8 milliseconds, which is less than 1/30 of a second. During this brief interval, the vehicle travels only a few feet.

Because of the extremely short time required to complete each measurement, the radar set is much less subject to the effects of signal fading, than is the case with prior radar sets having meter type measurement. Moreover, the range of the radar set is effectively increased, while also increasing the accuracy of the readings.

These factors are illustrated in FIG. 6, which is a curve or graph, showing the variation of the reflected signal strength, plotted against the range or distance of the vehicle from the radar set. It will be seen that the signal strength drops off rapidly with increasing range, and that there are a series of undulations in the curve. Thus, the curve has a series of peaks at which the reflected signal strength is relatively high. The peaks are interspersed between low points, at which the signal strength is relatively low. The undulations in the curve are due to phase interference between the directly radiated beam and the portion of the beam which is reflected by the ground, between the radar set and the vehicle. The directly radiated beam travels to and from the vehicle without being reflected from the ground. The path length of the portion of the beam which is reflected by the ground is slightly greater than the path length of the directly radiated beam, with the result that phase reinforcement and partial cancellation occur at alternate points along the path of the vehicle toward the radar set.

As the vehicle approaches the radar set, the reflected signal is subject to periodic fading, due to the peaks and valleys in the curve. This fading interferes with the accuracy of prior meter type radar sets, because the low points in the curve tend to cause the meter needle to waver or flicker. With prior radar sets, accurate readings cannot be obtained until the vehicle approaches closely enough to the radar set so that even the minimum points in the curve produce reflected signals which are strong enough to be usable.

In the case of the present invention, an accurate reading can be obtained at a much greater range, when one of the peaks in the curve rises above the minimum usable signal strength. The reading is completed in only a fraction of a second, before the vehicle passes into the next valley in the signal strength curve.

In FIG. 6, the minimum usable signal strength is represented by a horizontal broken line 300. The minimum usable signal strength may be regarded as the signal strength required to trigger the electronic timer 28. An accurate reading can be taken when the vehicle reaches the first peak 302 which rises above the line 300. Less than 1/30 of a second is required to complete the reading. Even at 100 miles per hour, the reading will be completed before the vehicle passes the peak. Subsequent readings can be taken whenever the curve rises above the horizontal line 300.

The present invention provides an effective violation alarm, which not only sounds an audible alarm, but also holds the reading on the digital display, so that the reading may be recorded by the operator. A permanent record of the reading can be made by operating the printer.

Those skilled in the art will understand that the values of the various components, employed in the illustrative embodiment disclosed herein, may be varied widely to suit various conditions. Those skilled in the art will be able to assign appropriate values to the various components. For the sake of complete understanding, however, it may be helpful to offer the following table, showing one set of appropriate values, merely by way of example:

| Resistor: | Value in ohms |
| --- | --- |
| 70 | 1M |
| 76 | 47K |
| 82 | 6.8K |
| 86 | 1K |
| 88 | 22K |
| 90 | 22K |
| 92 | 100 |
| 106 | 10K |
| 114 (variable) | 1M |
| 116 | 22K |
| 118 | 10K |
| 120 | 2.2K |
| 126 | 22K |
| 132 | 10K |
| 138 | 10K |
| 142 | 51K |
| 144 (variable) | 25K |
| 150 | 4.7K |
| 156 | 100 |
| 166 | 22K |
| 168 | 220K |
| 170 | 47K |
| 174 | 100K |
| 182 | 4.7K |
| 183 | 4.7K |
| 185 | 4.7K |
| 188 | 47K |
| 190 | 10K |
| 204 | 10K |
| 210 | 4.7K |
| 224 | 4.7K |
| 226–1 | 120K |
| 226–2 | 62K |
| 226–4 | 30K |
| 226–8 | 15K |
| 226–10 | 12K |
| 226–20 | 6.04K |
| 226–40 | 3K |
| 226–80 | 1.5K |
| 230 | 1470 |
| 238 | 4.7K |
| 240 | 845 |
| 242 (Pot.) | 10K |
| 246 | 2.2K |
| 252 | 2.2K |
| 254 | 10K |
| 256 | 2.2K |
| 270 | 33K |
| 272 | 82K |
| 274 | 10K |
| 278 | 680 |
| 280 | 1K |

| Capacitor: | Value in microfarads |
| --- | --- |
| 72 | .047 |
| 74 | .1 |
| 80 | .000470 |
| 84 | .005 |
| 94 | 1.0 |
| 102 | .02 |
| 122 | 3.3 |
| 124 | 1.0 |
| 140 | .56 |
| 154 | .47 |
| 178 | 6.8 |
| 180 | 6.8 |
| 192 | 10.0 |
| 200 | .02 |
| 258 | .01 |
| 276 | .22 |

Various other modifications, alternative constructions, and equivalents may be employed without departing from the true spirit and scope of the present invention, as exemplified in the foregoing description, and defined in the following claims.

I claim:
1. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
said means for triggering said timing pulse generator comprising means including a trigger gate for supplying said signal to said timing pulse generator,
and means responsive to the timing pulse for disabling said trigger gate to prevent retriggering of said timing pulse generator.

2. The combination of claim 1,
including switching means connected in circuit with said trigger gate for controlling the supply of said signal to said timing pulse generator.

3. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
said means for triggering said timing pulse generator comprising a trigger gate for supplying said signal thereto,
and means operable by said timing pulse generator for temporarily disabling said trigger gate for preventing retriggering of said timing pulse generator for an interval after the timing pulse.

4. The combination of claim 3,
including means operable by said digital counter for disabling said trigger gate to prevent retriggering of said timing pulse generator.

5. The combination of claim 3,
including means operable by said digital counter in response to the attainment of a predetermined count by said counter for disabling said trigger gate to prevent retriggering of said timing pulse generator.

6. The combination of claim 3,
including a converter connected to said digital counter for converting the digital output thereof to an analog signal,
adjustable means for producing a reference signal representing a violation limit,
a comparator for comparing said analog signal with said reference signal to detect a violation,
and means operable by said comparator for disabling said trigger gate to prevent retriggering of said timing pulse generator.

7. The combination of claim 6,
including an alarm device operable by said comparator.

8. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
and means operable by said digital counter for retaining the count thereon in response to the attainment of a predetermined count by said counter.

9. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
a converter connected to said counter for converting the digital output thereof to an analog signal,
adjustable means for producing a reference signal,
a comparator for comparing said analog signal with said reference signal,
and means operable by said comparator for retaining the count on said counter in response to the attainment of a predetermined count by said counter.

10. The combination of claim 9,
including an alarm device operable by said comparator.

11. The combination of claim 9,
including manually operable means for resetting said counter.

12. A Doppler radar set,
comprising the combination of input means for providing a signal having a frequency proportional to the speed of a vehicle,
an electronic counter for counting the cycles of said signal,
an electronic timer for activating said counter for a predetermined timing interval, whereby said counter produces a reading corresponding to the speed of the vehicle,
and trigger means for supplying said signal to said electronic timer for triggering said timer,
said trigger means including means operable by said electronic timer for delaying the retriggering of said electronic timer after said timing interval.

13. A Doppler radar set,
comprising the combination of input means for providing a signal having a frequency proportional to the speed of a vehicle,
an electronic counter for counting the cycles of said signal,
an electronic timer for activating said counter for a predetermined timing interval, whereby said counter produces a reading corresponding to the speed of the vehicle,
trigger means for triggering said electronic timer,
and means operable by said counter in response to the attainment of a predetermined count for preventing the retriggering of said electronic timer.

14. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
a variable gain amplifier connected between said input means and said gate,
and means operable by said timing pulse generator for increasing the gain of said amplifier for the duration of said timing pulse.

15. In a Doppler radar set, the combination comprising
input means for providing a signal having a frequency proportional to the speed of a vehicle,
a digital counter adapted to count the cycles of said signal,
a signal gate connected between said input means and said digital counter,
a timing pulse generator for producing a timing pulse corresponding to a predetermined interval,
means for triggering said timing pulse generator,
means connecting the output of said timing pulse generator to said gate for activating said gate for said predetermined interval, whereby said digital counter produces a reading directly proportional to the speed of the vehicle,
a variable gain amplifier connected between said input means and said signal gate,
said amplifier having a negative feedback circuit with a normally activated feedback gate for controlling the negative feedback,
and means operable by said timing pulse generator for disabling said feedback gate at least for the duration of said timing pulse to increase the gain of said variable gain amplifier.

16. The combination of claim 15,
in which said feedback gate comprises an electronic switching component,
and means for supplying the timing pulse to said electronic switching component.

17. The combination of claim 16,
in which said electronic switching component comprises a transistor for effectively short-circuiting the negative feedback circuit.

18. A Doppler radar set,
comprising the combination of input means for providing a signal having a frequency proportional to the speed of a vehicle,
an electronic counter for counting the cycles of said signal,
an electronic timer for activating said counter for a predetermined timing interval, whereby said counter produces a reading corresponding to the speed of the vehicle,
a variable gain amplifier connected between said input means and said counter,
and means operable by said electronic timer for increasing the gain of said amplifier during said timing interval.

19. A Doppler radar set,
comprising the combination of input means for providing a signal having a frequency proportional to the speed of a vehicle,
an electronic counter for counting the cycles of said signal,
an electronic timer for activating said counter for a predetermined timing interval, whereby said counter produces a reading corresponding to the speed of the vehicle,
a variable gain amplifier connected between said input means and said counter,
said amplifier having a controllable negative feedback circuit,
and means operable by said electronic timer for disabling said feedback circuit to increase the gain of said amplifier during said timing interval.

References Cited

UNITED STATES PATENTS

| | | | |
|---|---|---|---|
| 2,524,610 | 10/1950 | Storm et al. | 343—8 |
| 2,752,593 | 6/1956 | Downs | 343—8 |
| 2,878,467 | 3/1959 | Barker et al. | 343—8 |
| 3,024,443 | 3/1962 | Barker et al. | 324—69 X |
| 3,034,049 | 5/1962 | Downs | 343—8 X |

RODNEY D. BENNETT, *Primary Examiner.*

CHARLES L. WHITMAN, *Assistant Examiner.*

U.S. Cl. X.R.

324—69; 340—263